United States Patent
Packter

(10) Patent No.: US 7,594,814 B2
(45) Date of Patent: Sep. 29, 2009

(54) PRAYER REMINDER DEVICE

(75) Inventor: Naphtalie Packter, Jerusalem (IL)

(73) Assignee: Rael Chemicals Export (1981) Ltd., Jerusalem (IL)

( * ) Notice: Subject to any disclaimer, the term of this patent is extended or adjusted under 35 U.S.C. 154(b) by 629 days.

(21) Appl. No.: 11/126,925

(22) Filed: May 10, 2005

(65) Prior Publication Data

US 2005/0255432 A1    Nov. 17, 2005

(30) Foreign Application Priority Data

May 11, 2004    (IL) .................... 161927

(51) Int. Cl.
G09B 19/00    (2006.01)

(52) U.S. Cl. .................................... 434/245

(58) Field of Classification Search .......... 434/245, 434/178; 116/234–237, 239; 281/42; D19/34
See application file for complete search history.

(56) References Cited

U.S. PATENT DOCUMENTS

| 916,561 | A | * | 3/1909 | Kahn | 40/374 |
| 2,060,624 | A | * | 11/1936 | Kenedy | 281/42 |
| 3,477,146 | A | * | 11/1969 | Warneke | 434/405 |
| 4,608,772 | A | * | 9/1986 | Gill | 40/495 |
| 4,647,276 | A | | 3/1987 | Smoczynski | |
| 5,249,546 | A | * | 10/1993 | Pennelle | 116/234 |
| 5,408,950 | A | * | 4/1995 | Porto | 116/239 |
| 6,057,009 | A | | 5/2000 | McGlew | |
| 6,109,205 | A | * | 8/2000 | Smith | 116/234 |
| 6,540,519 | B2 | | 4/2003 | Wexler | |
| D477,360 | S | * | 7/2003 | Larkins et al. | D19/26 |
| 6,589,056 | B2 | | 7/2003 | McGovern | |
| D486,855 | S | * | 2/2004 | Bailey | D19/34 |
| 6,948,447 | B1 | * | 9/2005 | Yingling | 116/234 |
| 2002/0139291 | A1 | * | 10/2002 | Roundy | 116/234 |
| 2005/0081776 | A1 | * | 4/2005 | Moranville | 116/238 |
| 2005/0120940 | A1 | * | 6/2005 | Sinclair et al. | 116/234 |
| 2006/0118030 | A1 | * | 6/2006 | Daley | 116/234 |
| 2006/0144316 | A1 | * | 7/2006 | Johnson | 116/234 |

FOREIGN PATENT DOCUMENTS

GB    2335390    *    9/1999

* cited by examiner

*Primary Examiner*—Kurt Fernstrom
(74) *Attorney, Agent, or Firm*—Bachman & LaPointe, P.C.

(57) ABSTRACT

A device for use in conjunction with a prayer book and sized to be inserted within the confines thereof is provided with a plurality of individual tabs, the tabs being individually extendable from the device to protrude beyond the confines of the book and is provided with indicia to visually remind the user of specific prayers, prayer segments and words applicable to the prayers of a specific day.

8 Claims, 3 Drawing Sheets

PRAYER REMINDER DEVICE

BACKGROUND OF THE INVENTION (1) Field of the Invention

The present invention relates to prayer aids. More particularly, the invention provides a changeable reminder device for insertion into a prayer book to remind the worshipper of additional prayers or insertions to be recited besides the normal daily prayers, pertaining to a particular day or required due to other special circumstances.

(2) Prior Art

Some prayers have variations which must be taken into account by the person praying and which relate to the day on which the prayer is being said. For example, according to Jewish law a special prayer, "In the days of Mordechai and Esther . . . " must be inserted into the normal daily prayers on the festival of Purim. Failure to recite the relevant addition to the regular prayers may in some circumstances require of the worshipper to go back several pages and to again recite the prayer while including the previously omitted text. Inadvertent omissions are quite common by those not taking special care, and particularly by those who know some of the prayers well enough to pray without constant use of a prayer book.

Most synagogues have inscribed elongated plates which are supported by a holder and displayed on a wall of the synagogue. The plates each carry a reminder, for example the text "Who makes the wind blow and makes rain descend" which must be added to the regular prayers during the winter season. Nevertheless, many prayers are said by rote and even the cantor leading prayers is occasionally embarrassed by a mistaken inappropriate addition or an omission of a required section.

Catholics reciting the rosary are known to have difficulties relating to the number of times such prayer is said, and the variations thereof. U.S. Pat. Nos. 4,647,276 6,057,009 and 6,589,056 describe devices intended to assist the worshipper reciting this prayer, mainly by providing a counting device. The devices are hand held and are not intended for insertion into a prayer book. Electrically operated devices are also known for the same purpose, an example being seen in U.S. Pat. No. 6,540,519 B2.

SUMMARY OF THE INVENTION

In view of this state of the prior art, it is now one of the objects of the present invention to overcome the limitations of prior art devices and to provide a reminder device which can be used by an individual worshipper whether the prayer book being used is open or closed.

It is a further object of the present invention to provide guidance to the worshipper regarding which extra portion of prayer should be added to suit each day.

Yet a further object of the present invention is the provision of a reminder device, the operation of which does not contravene any of the numerous restrictions applicable to days of rest.

The present invention achieves the above objects by providing a device for use in conjunction with a prayer book and sized to be inserted within the confines thereof, said device being provided with a plurality of individual tabs, said tabs being individually extendable from said device to protrude beyond the confines of said book and being provided with indicia to visually remind the user of specific prayers, prayer segments and words applicable to the prayers of a specific day.

In a preferred embodiment of the present invention there is provided a device having means for attachment to a cover of said prayer book.

In a most preferred embodiment of the present invention there is provided a device in conjunction with a table designating which additions/omissions are applicable on various days of a given year, thus guiding the user in setting the tabs of the device.

Yet further embodiments of the invention will be described hereinafter.

It will thus be realized that the novel device of the present invention serves to clearly remind the worshipper of special prayer inserts, whether or not the prayer book in use is open or closed. Furthermore, there is no difficulty in setting the device to indicate multiple prayer items, as each tab is extendable individually without reference to other tabs.

The device will be produced in an attractive manner by the use of colors and possibly diagrams appearing on the tabs where appropriate. The result will be a useful item that will be in demand by users in a simple embodiment, and will also serve as an attractive gift item when manufactured for long-term durability according to a further embodiment.

Those familiar with Jewish religious law will be aware that in contradistinction to electrically operated devices, the present invention discloses a device which may be used on the Sabbath and Festivals without contravening the many restrictions applicable to days of rest.

Extension of the appropriate tabs can conveniently be carried out in the place of prayer and before the start thereof. However parents of children not praying together can set the tabs of the device inserted in the child's prayer book, before the child leaves home, thus guiding and educating the child in the recitation of the correct prayers.

With regard to the size of the device, a small version the size of a pocket prayer book could be used also by those using full-size prayer books. However a larger version will also be produced, as being easier to read and being more suitable for the prayer book into which it is to be inserted.

The devices illustrated in the diagrams are suitable for insertion adjacent to the left of the prayer book covers. Obviously, the design can equally well be configured to allow insertion inside the right hand cover.

The invention will now be described in connection with certain preferred embodiments with reference to the following illustrative figures so that it may be more fully understood.

BRIEF DESCRIPTION OF THE DRAWINGS

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE PREFERRED EMBODIMENT(S)

Figure 1:
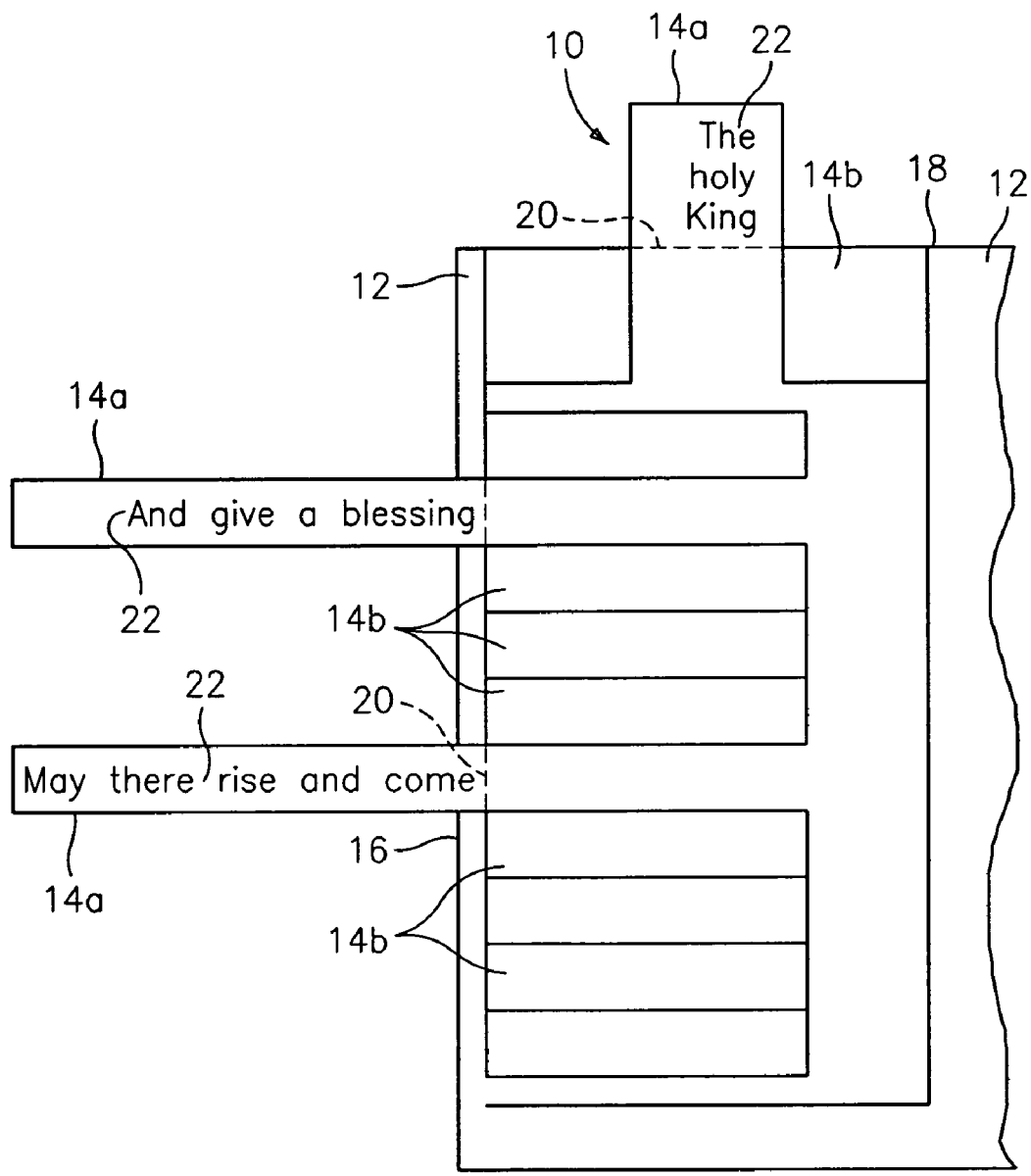
FIG. 1 is a plan view of a preferred embodiment of the reminder device inserted into a prayer book, according to the invention.

There is seen in FIG. 1 a reminder device 10 for use in conjunction with a prayer book 12. The device 10 is sized to be inserted within the confines of book 12. As prayer books differ in size, the device too will be produced in several sizes.

The device 10 is provided with a plurality of individual tabs 14a, 14b, which can be made of paper, cardboard or plastic.

All tabs can be individually extended from the device, to project beyond the outside the edges of the book 12. The diagram shows three deployed tabs 14a and ten retracted tabs 14b. In the device seen tabs 14a extend over the left edge 16 and over the top edge 18 of the book 12.

In the present embodiment the device 10 is made of paper and the tabs 14a, 14b are foldably extendable and retractable. For a device made of cardboard a hinge mark 20 is provided of the type commonly seen in small boxes used to package therein medical items. Where the chosen material is a plastic, the fold hinge line is a "living hinge". The preferred plastic for this purpose is polypropylene.

As clearly seen, when the tab 14a is folded out it protrudes beyond the confines of the book 12, and being provided with the appropriate indicia 22, visually reminds the user of specific prayers, prayer segments and words applicable to the prayers to be said on a specific day.

With regard to the rest of the figures, similar reference numerals have been used to identify similar parts.

Figure 2:
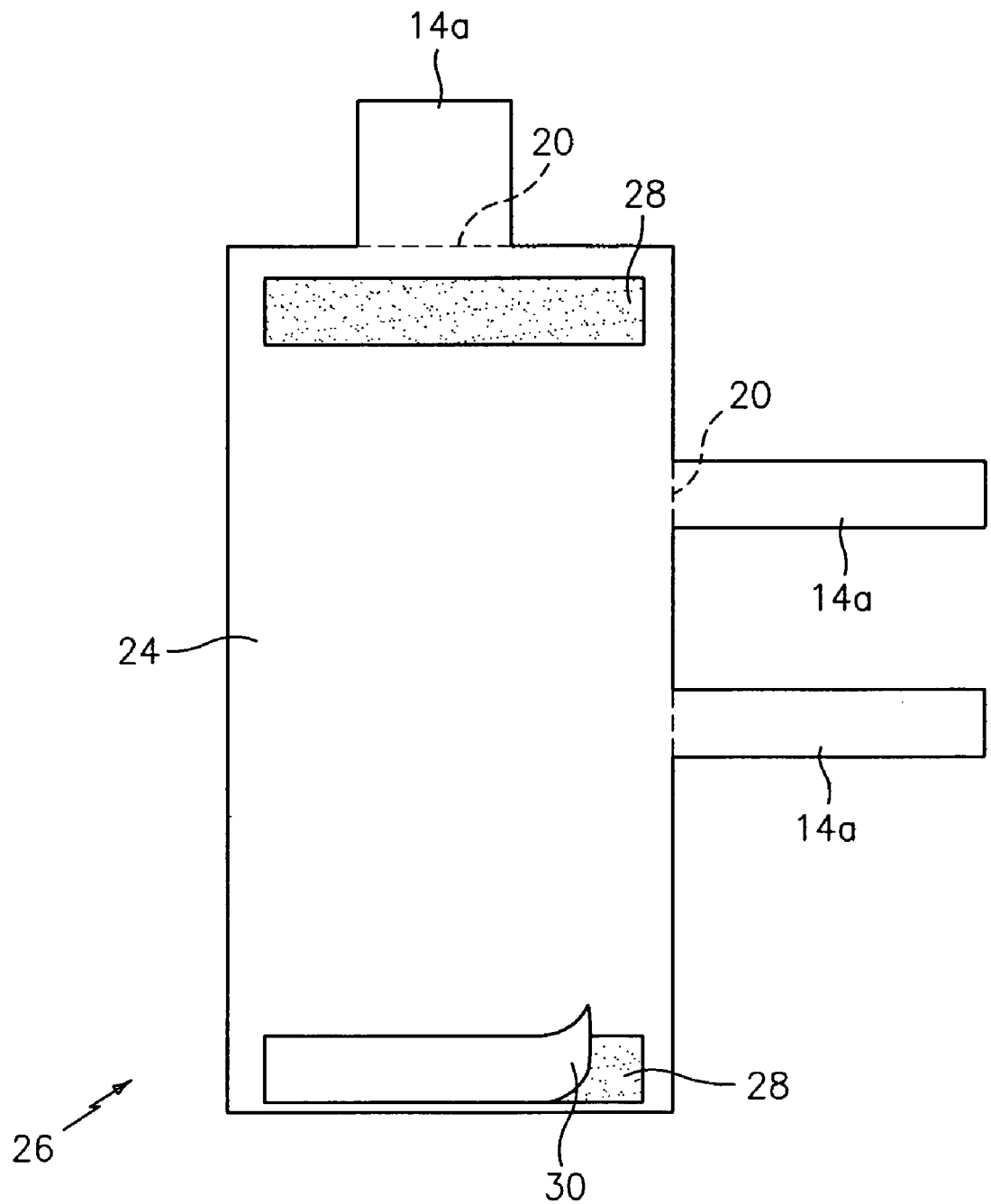
FIG. 2 is a rear view of an embodiment attachable to a prayer book.

Referring now to FIG. 2, there is seen the rear face 24 of a device 26 provided with means for attachment inside a cover of the prayer book 12 seen in FIG. 1.

The device 26 is provided with a plurality of areas coated with a pressure-sensitive adhesive 28. The adhesive 28 is covered by a release paper 30 until the device is to be attached in a prayer book.

Adhesive attachment ensures that the device is not lost and furthermore that the device 26 remains correctly positioned for use.

Figure 3:
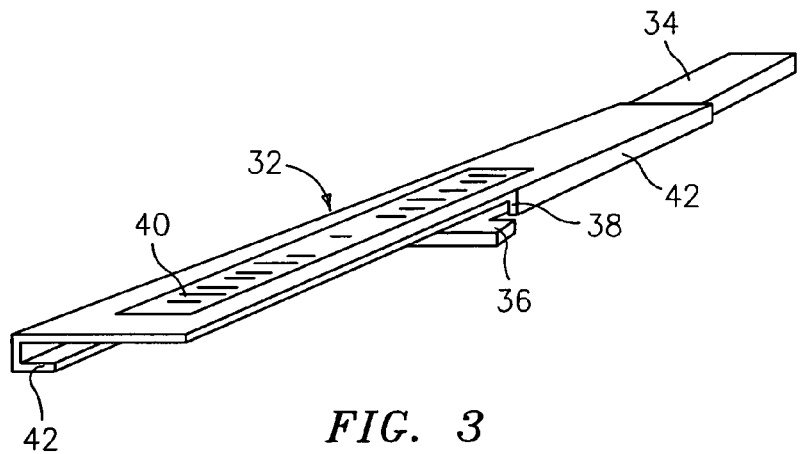
FIG. 3 is a detail perspective view of a single tab which is slidably extended.

FIG. 3 illustrates a detail of a device wherein the tabs 32 are slidably extendable therefrom.

The diagram shows a luxury version of the device. The extendable tabs 32 are made of thin metal, suitably stainless steel to prevent formation of indenting marks on the pages of the prayer book adjacent thereto.

The device (only the arm 34 thereof is seen in this detail view) is molded using a plastic, and supports all the tab arms 34.

Each tab arm 34 is advantageously provided with an outer stop element 36 which abuts an 38 edge of the tab 32, preventing inadvertent loss thereof.

The indicia 40 carried by the tab 32 are preferably pressed by a suitable embossing die. The tab 32 is slidably retained on the arm 34 by means of a bent-over edge 42.

Figure 4:
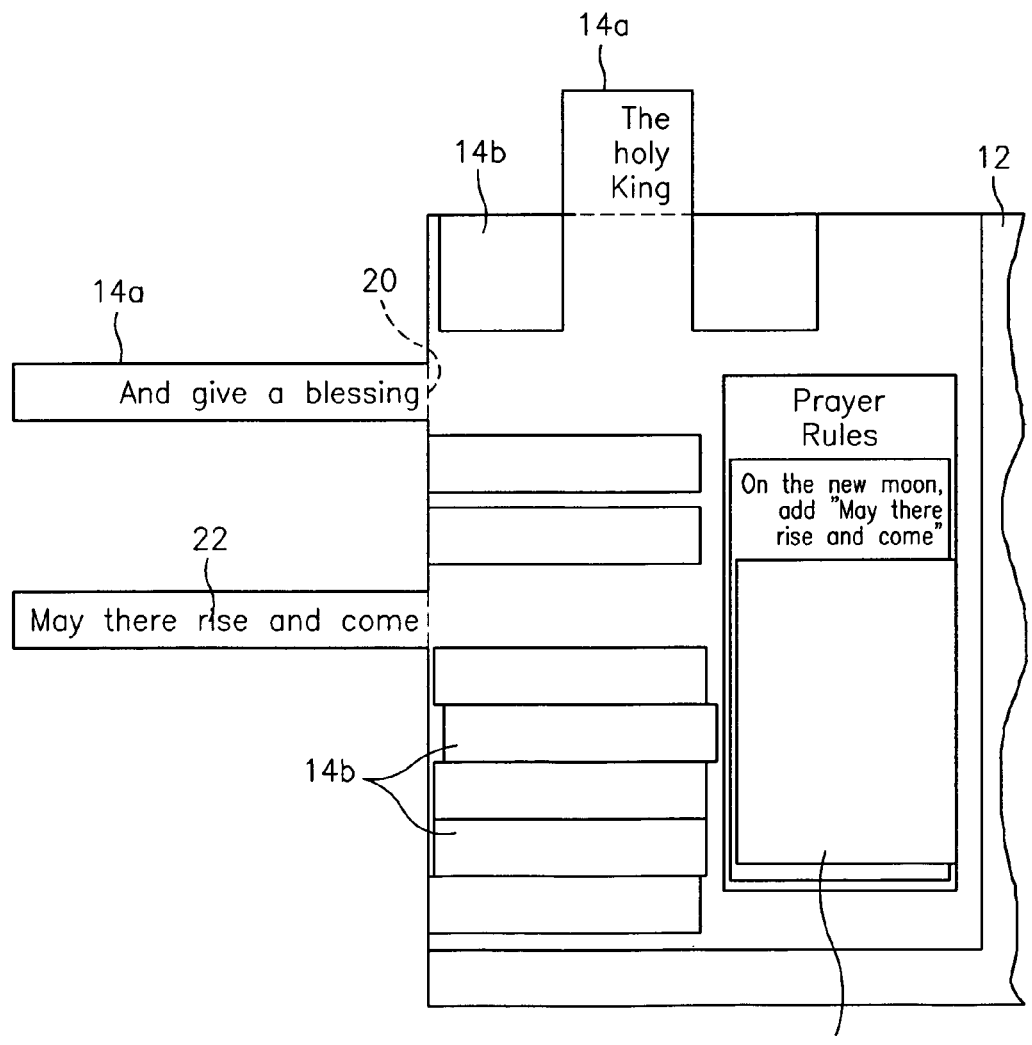
FIG. 4 is a plan view of an embodiment inserted in a prayer book and including guidance regarding days requiring prayer additions and omissions.

Seen in FIG. 4 is a device similar to 10 seen in FIG. 1, in conjunction with a table 44 designating the tabs 14a applicable to various days of a given year. Such information can be quite complex, and the table 44 can be arranged to carry only information regarding prayer sections regarding which worshippers are often in doubt.

An extension of the device to form an additional page (not shown) can carry more useful information on this subject.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of visually reminding a user of specific prayers, comprising the steps of providing a prayer book; providing a device sized to be inserted within the confines thereof, said device being provided with a plurality of individual tabs, said tabs being individually extendable from said device to protrude beyond the confines of said book and being provided with indicia comprising specific prayers, prayer segments and words applicable to the prayers of a specific day; extending one or more individual tabs and visually reminding oneself of said specific prayers, prayer segments and words applicable to the prayers of a specific day by viewing said one or more individual tabs.

2. A method according to claim 1, wherein said device providing step comprises providing means for attachment to a cover of said prayer book.

3. A method according to claim 1, wherein said device providing step comprises providing said individual tabs which are made of a material selected from the group consisting of paper, cardboard and plastic.

4. A method according to claim 1, wherein said device providing step comprises providing said individual tabs which are foldably extendable from said device.

5. A method according to claim 1, wherein said device providing step comprises providing said individual tabs which are slidably extendable from said device.

6. A method according to claim 5, wherein said device providing step comprises providing said individual tabs which are made of metal and are supported by a plastic device.

7. A method according to claim 5, wherein said device providing step comprises providing stop means for preventing inadvertent loss of said tabs.

8. A method according to claim 1, further comprising using said device in conjunction with a table designating the tabs applicable to various days of a given year.

* * * * *

UNITED STATES PATENT AND TRADEMARK OFFICE
CERTIFICATE OF CORRECTION

PATENT NO. : 7,594,814 B2  Page 1 of 1
APPLICATION NO. : 11/126925
DATED : September 29, 2009
INVENTOR(S) : Naphtalie Packter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Twenty-eighth Day of September, 2010

David J. Kappos
*Director of the United States Patent and Trademark Office*